US008608352B2

(12) United States Patent
Tsai

(10) Patent No.: US 8,608,352 B2
(45) Date of Patent: Dec. 17, 2013

(54) ILLUMINATING DEVICE

(75) Inventor: Wen-Kuei Tsai, Taipei (TW)

(73) Assignee: GE Investment Co., Ltd., Taipei (TW)

( * ) Notice: Subject to any disclaimer, the term of this patent is extended or adjusted under 35 U.S.C. 154(b) by 324 days.

(21) Appl. No.: 13/191,022

(22) Filed: Jul. 26, 2011

(65) Prior Publication Data

US 2013/0003392 A1 Jan. 3, 2013

(30) Foreign Application Priority Data

Jun. 28, 2011 (TW) ............................ 100122634 A

(51) Int. Cl.
*B60Q 1/06* (2006.01)

(52) U.S. Cl.
USPC ......... 362/373; 362/249.02; 362/294; 313/46

(58) Field of Classification Search
USPC .................. 362/373, 249.02, 294; 313/45, 46
See application file for complete search history.

(56) References Cited

U.S. PATENT DOCUMENTS

2010/0027270 A1* 2/2010 Huang et al. .................. 362/310
2012/0146481 A1* 6/2012 Li et al. ........................... 313/46

* cited by examiner

*Primary Examiner* — Vip Patel
(74) *Attorney, Agent, or Firm* — Muncy, Geissler, Olds & Lowe, PLLC

(57) ABSTRACT

An illuminating device is disclosed in this invention. The illuminating device includes a shell, a light module, and a fan. The light module is disposed on the shell. The shell includes a sealed space. The fan is disposed within the sealed space.

18 Claims, 7 Drawing Sheets

ILLUMINATING DEVICE

BACKGROUND OF THE INVENTION

1. Field of the Invention

The present invention generally relates to an illuminating device, and more particularly to an illuminating device having better cooling performance.

2. Description of the Prior Art

Due to various advantages of a light-emitting diode (LED) such as small volume, short response time, low power consumption, high reliability and high feasibility of mass production, the LED is replacing conventional lighting devices such as light bulbs or fluorescent lamps.

However, as the luminance and luminous efficiency of the light-emitting diodes have been improved gradually, high-power light emitting diodes have heat-dissipating issues. If the light-emitting diodes are operated in the high temperature situation, the luminance of the light-emitting diodes may decrease. Moreover, the operation life of the light-emitting diodes may also decrease. Therefore, the heat-dissipating design of the lighting device having the light-emitting diodes has become an important concern of designers.

SUMMARY OF THE INVENTION

In view of the foregoing, it is an object of the embodiment of the present invention to provide an illuminating device having better cooling performance.

According to one embodiment, an illuminating device is provided in this invention. The illuminating device includes a shell, a light module, and a fan. The light module is disposed on the shell. The shell includes a sealed space. The fan is disposed within the sealed space.

By the illuminating device of the present invention mentioned above, the air flow within the sealed space is in forced convection condition with the use of the fan. The heat generated by the light module can be quickly transferred to the whole sealed space. Then, the heat is dissipated by the shell. There is no need to transfer the heat to the whole shell by the thickness of the shell. Thus, the illuminating device of the present invention can be light-weighted. Besides, the illuminating device of the present invention can have better cooling performance. Moreover, because the fan is disposed within the sealed space, the fan will not be affected by moisture or dust. The fan can have a longer life. The operation sound of the fan will not bother the user.

DETAILED DESCRIPTION OF THE INVENTION

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components.

Figure 1:
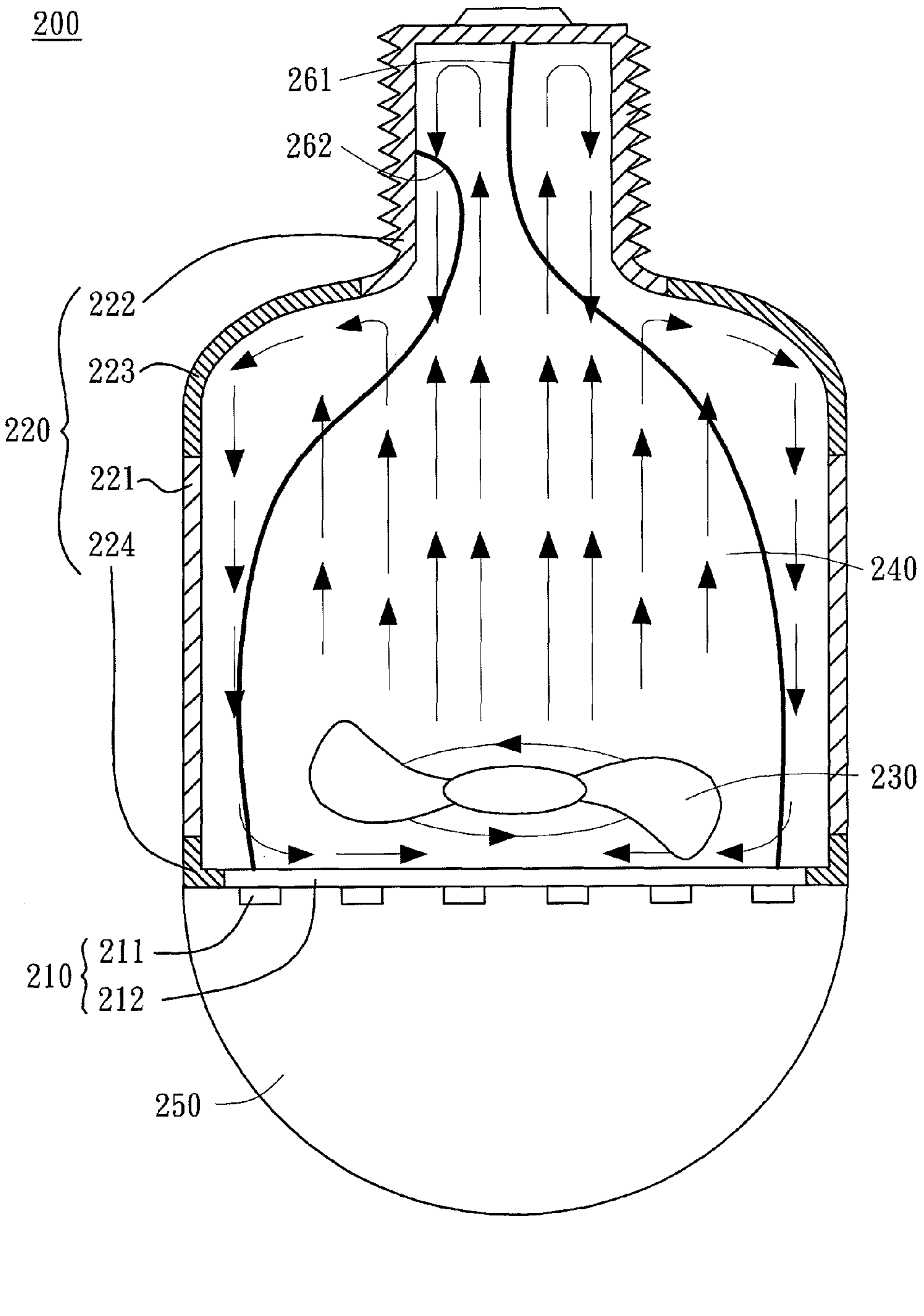
FIG. 1 shows the sectional view of an illuminating device in accordance with an embodiment of the present invention.

FIG. 1 shows the sectional view of an illuminating device 200 in accordance with an embodiment of the present invention. The illuminating device 200 includes a shell 220, a light module 210, and a fan 230. The light module 210 is disposed on the shell 220. The shell 220 includes a sealed space 240. The fan 230 is disposed within the sealed space 240, wherein the fan 230 makes the air flow within the sealed space 240 be in forced convection condition so as to make the heat generated by the light module 210 be transferred to the whole sealed space 240. Then, the heat is dissipated by the whole shell 220.

Because the heat transfer rate of the forced convection is much higher than the heat transfer rate of the natural convection, the illuminating device 200 of the present invention can have better cooling performance. Besides, there is no need to transfer the heat to the whole shell 220 by the thickness of the shell 220. Thus, the illuminating device 200 of the present invention can be light-weighted. Moreover, because the fan 230 is disposed within the sealed space 240, the fan 230 will not be affected by moisture or dust. The fan 230 can have a longer life. The operation sound of the fan 230 will not bother the user.

According to this embodiment, the light module 210 includes a plurality of LED elements 211 and a substrate 212. The LED elements 211 are disposed on the substrate 212, wherein the substrate 212 includes a driving circuit for providing electrical power to the LED elements 211. In this embodiment, the driving circuit is formed on the substrate 212, but not limited to this. The driving circuit can be a driving module which is separated from the LED elements 211. The driving module can be disposed at a specific position within the sealed space 240 for easily performing heat dissipating. Besides, the power needed by the fan 230 can be provided by the driving circuit. Or the power needed by the fan 230 can be provided by the electrical power source directly.

Moreover, in this embodiment, the substrate 212 is a metal substrate, such as an aluminum substrate. Because the metal substrate has better heat transfer properties, the heat generated by the LED elements 211 can be transferred to the whole substrate 212. Then, the heat is dissipated by the forced convection formed by the fan 230. Because the illuminating device 200 of the present invention can have better cooling performance, the situations of decreased luminance and operation life of the light-emitting diodes, which are caused by high temperature, can be avoided. The light module 210 includes a plurality of LED elements 211, but not limited to this. The light module 210 can include at least one organic light emitting diode (OLED), at least one polymer light-emitting diode (PLED), or a laser light source.

The light module 210 can further include a lampshade 250. The lampshade 250 is made of light penetrating material. The lampshade 250 can be treated by the surface roughing treatment. Thus, the lampshade 250 is able to convert the light projected by LED elements 211 to diffuse light so as to soften the light and reduce glare.

In this embodiment, the illuminating device 200 is a LED lamp, but not limited to this. The illuminating device 200 can be applied in many kinds of illuminating devices, such as mercury vapor lamps, illumination lamp sets, ceiling lamps, down lamps, or recessed lamps.

As shown in FIG. 1, in this embodiment, the shell 220 includes a metal portion 221, a lamp head 222, a first insulating portion 223, and a second insulating portion 224. The lamp head 222 can be enclosed within a lamp socket, electrical power is transferred from the lamp head 222 to the substrate 212 through the wire 261 and the wire 262. The first insulating portion 223 is disposed between the lamp head 222 and the metal portion 221 for insulating the electrical power of the lamp head 222. The second insulating portion 224 is disposed between the light module 210 and the metal portion 221 for insulating the electrical power of the light module 210.

Because the heat transfer rates of the first insulating portion 223 and the second insulating portion 224 are lower, the heat generated by the light module 210 can not be easily transferred to the whole shell 220 through the first insulating portion 223 and the second insulating portion 224. However, by the forced convection formed by the fan 230, the heat generated by the light module 210 can be easily transferred to the whole shell 220. The high temperature situations, which are caused by the lower heat transfer rates of the first insulating portion 223 and the second insulating portion 224, can be avoided. Moreover, the air flow of the forced convection formed by the fan 230 can flow into the lamp head 222 directly. Thus, a part of the heat generated by the light module 210 can be transferred to the lamp head 222. Then, the heat is dissipated by the lamp head 222 and the lamp socket.

As shown in FIG. 1, in this embodiment, the fan 230 is disposed near the light module 210, but not limited to this. The fan 230 can be disposed at any proper position within the sealed space 240. For example, the fan 230 can be disposed near the lamp head 222, or the fan 230 can be disposed at a center position within the sealed space 240. Moreover, in this embodiment, the fan 230 rotates in the counterclockwise direction for making the air near the light module 210 flow into the lamp head 222 directly, but not limited to this. The fan 230 can rotate in the clockwise direction for making the air flow towards the light module 210.

Figure 2:
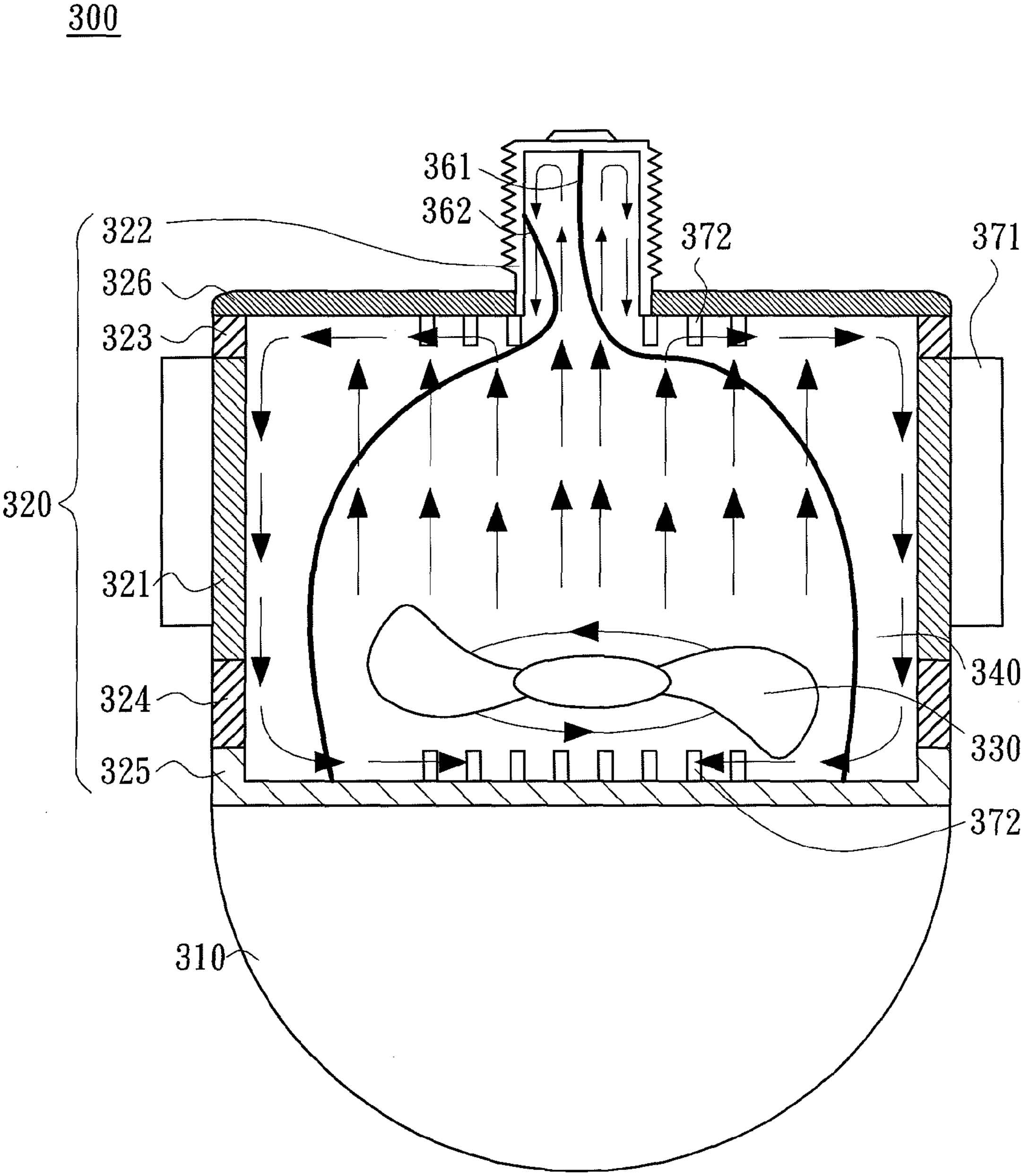
FIG. 2 shows the sectional view of an illuminating device in accordance with another embodiment of the present invention.

FIG. 2 shows the sectional view of an illuminating device 300 in accordance with another embodiment of the present invention. The illuminating device 300 includes a shell 320, a light module 310, and a fan 330. The light module 310 is disposed on the front end of the shell 320. The shell 320 includes a sealed space 340. The fan 330 is disposed within the sealed space 340, wherein the shell 320 includes at least one inner cooling fin 372 and at least one outer cooling fin 371. The inner cooling fin 372 is disposed within the sealed space 340, and the outer cooling fin 371 contacts outside air.

The fan 330 makes the air flow within the sealed space 340 be in forced convection condition. The air flow contacts the inner cooling fin 372 so as to make the heat generated by the light module 310 be transferred to the whole sealed space 340. Then, the heat is dissipated by the outer cooling fin 371 of the shell 320.

As shown in FIG. 2, in this embodiment, the shell 320 includes a metal portion 321, a lamp head 322, a first insulating portion 323, a second insulating portion 324, a front cover 325, and a back cover 326. The inner cooling fins 372 are disposed on the front cover 325 and the back cover 326. The outer cooling fins 371 are disposed on the metal portion 321.

The light module 310 is disposed on the front cover 325 of the shell 320. The lamp head 322 can be enclosed within a lamp socket, electrical power is transferred from the lamp head 322 to the light module 310 through the wire 361 and the wire 362. The first insulating portion 323 is disposed between the lamp head 322 and the metal portion 321 for insulating the electrical power of the lamp head 322. The second insulating portion 324 is disposed between the light module 310 and the metal portion 321 for insulating the electrical power of the light module 310. The back cover 326 can be made of insulating material for insulating the electrical power of the lamp head 322. For example, the back cover 326 can be made of insulating material, such as ceramic material or plastic material.

Because the heat transfer rates of the first insulating portion 323 and the second insulating portion 324 are lower, the heat generated by the light module 310 can not be easily transferred to the whole shell 320 through the first insulating portion 323 and the second insulating portion 324. However, by the forced convection formed by the fan 330, the heat generated by the light module 310 can be easily transferred to the whole shell 320. Herein, a part of the heat generated by the light module 310 can be transferred to the lamp head 322. Then, the heat is dissipated by the lamp head 322 and the lamp socket. Moreover, because the second insulating portion 324 has the lower heat transfer rate and the insulating properties, the user can hold the second insulating portion 324 for performing disassembling process or assembling process.

As shown in FIG. 2, in this embodiment, the fan 330 is disposed near the light module 310, but not limited to this. The fan 330 can be disposed at any proper position within the sealed space 340. For example, the fan 330 can be disposed near the lamp head 322, or the fan 330 can be disposed at a center position within the sealed space 240. Moreover, in this embodiment, the fan 330 rotates in the counterclockwise direction for making the air near the light module 310 flow into the lamp head 222 directly, but not limited to this. The fan 330 can rotate in the clockwise direction for making the air flow towards the light module 310.

Figure 3:
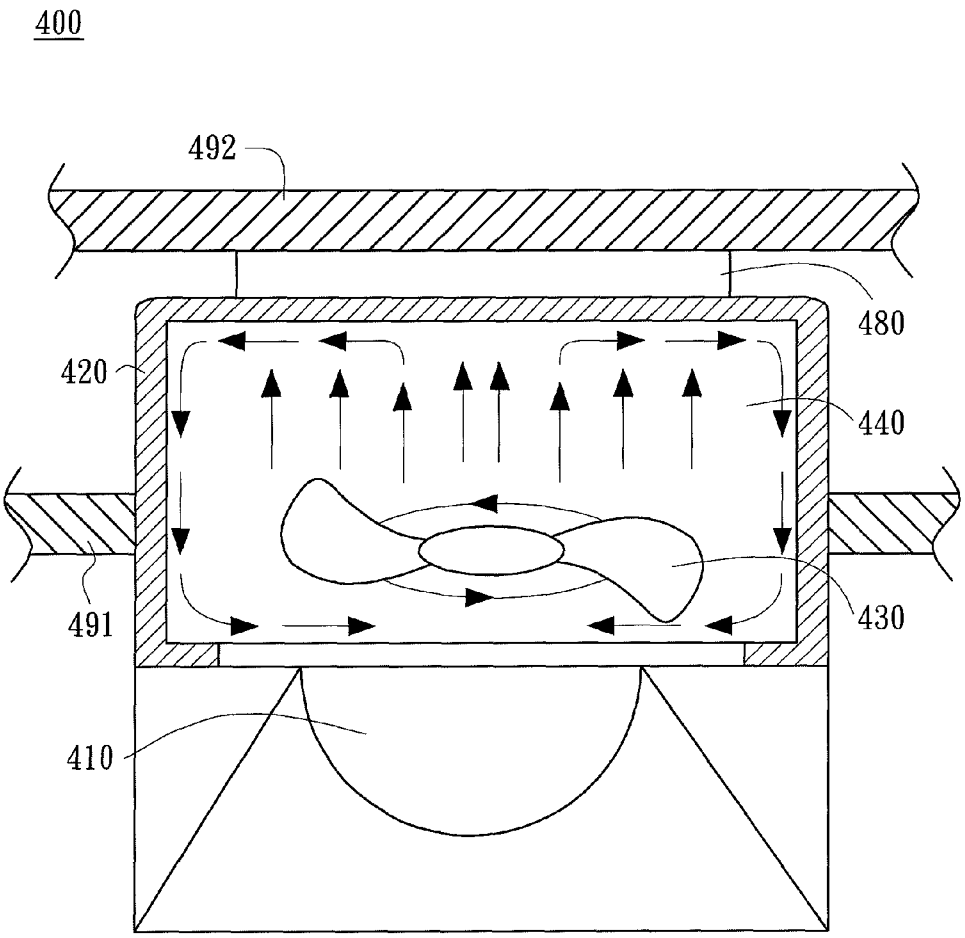
FIG. 3 shows the sectional view of an illuminating device in accordance with another embodiment of the present invention.

FIG. 3 shows the sectional view of an illuminating device 400 in accordance with another embodiment of the present invention. The illuminating device 400 includes a shell 420, a light module 410, and a fan 430. The light module 410 is disposed on the front end of the shell 420. The shell 420 includes a sealed space 440.

As shown in FIG. 3, in this embodiment, the illuminating device 400 is fixed on the ceiling 491 of a building 492, wherein a flexible conductor 480 is disposed between the back end of the shell 420 and the building 492. The flexible conductor 480 contacts the back end of the shell 420 and the building 492 for transferring the heat of the shell 420 to the building 492.

When the fan 430 makes the air flow within the sealed space 440 be in forced convection condition. The heat generated by the light module 410 can be transferred to the shell 420. Then, the heat is dissipated by the shell 420, wherein a part of the heat is be transferred to the building 492 through the flexible conductor 480. As shown in FIG. 3, in this embodiment, the fan 430 is disposed near the light module 410, but not limited to this. The fan 430 can be disposed at any proper position within the sealed space 440. For example, the fan 430 can be disposed at a center position within the sealed space 440. Moreover, in this embodiment, the fan 430 rotates in the counterclockwise direction for making the air near the light module 410 flow towards the flexible conductor 480 directly, but not limited to this. The fan 430 can rotate in the clockwise direction for making the air flow towards the light module 410.

Figure 4A:
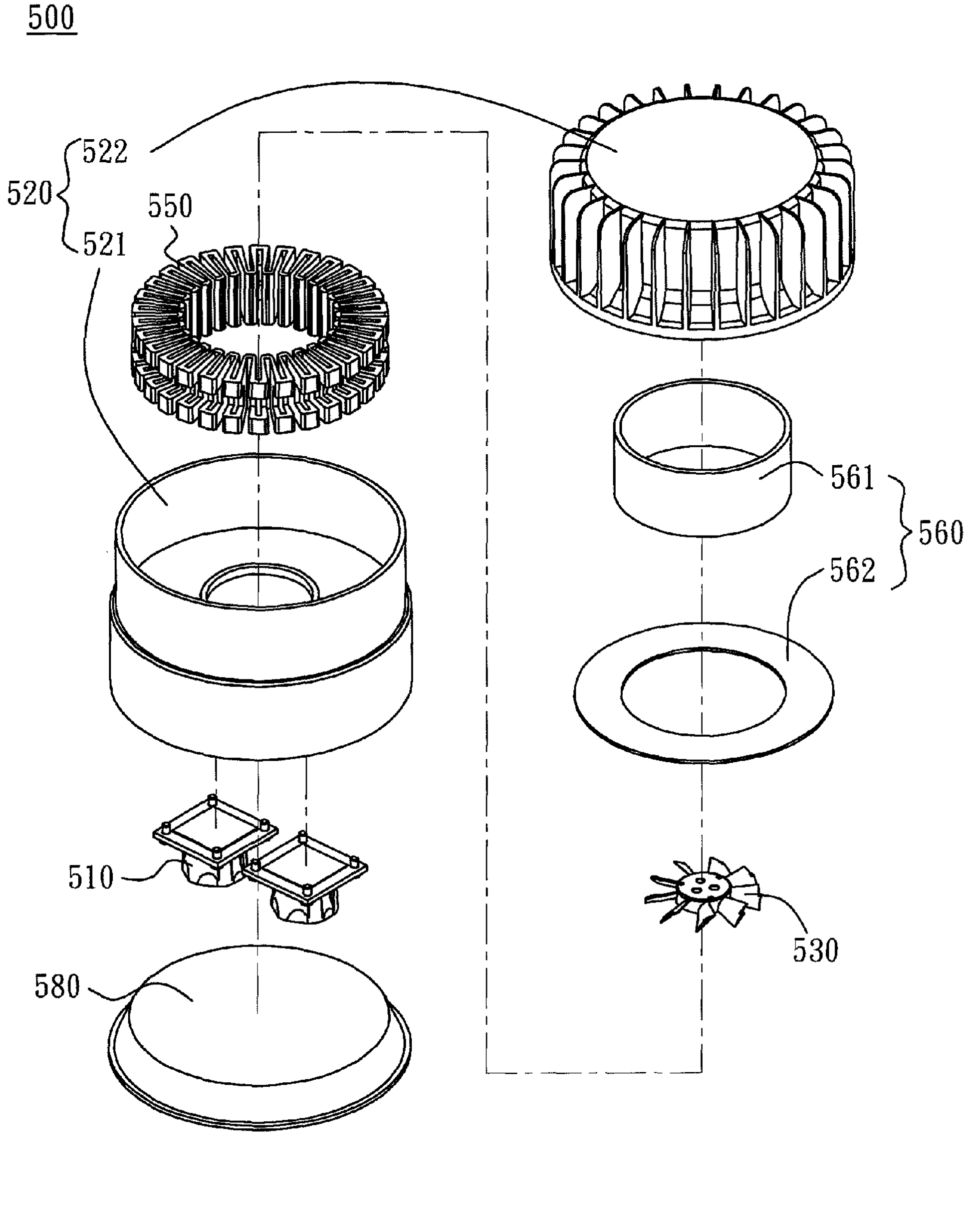
FIG. 4A shows the exploded view of an illuminating device in accordance with another embodiment of the present invention.

FIG. 4A shows the exploded view of an illuminating device 500 in accordance with another embodiment of the present invention. The illuminating device 500 includes a shell 520, at least one light module 510, a fan 530, a heat dissipating module 550, an air guide device 560, and a lampshade 580. Herein the shell 520 includes a frame 521 and a back cover 522. The heat dissipating module 550 includes a plurality of cooling fins, wherein the cooling fins form at least one longitudinal air passage and at least one circular air passage. The air guide device 560 includes a barrel 561 and a circular plate 562.

Figure 4B:
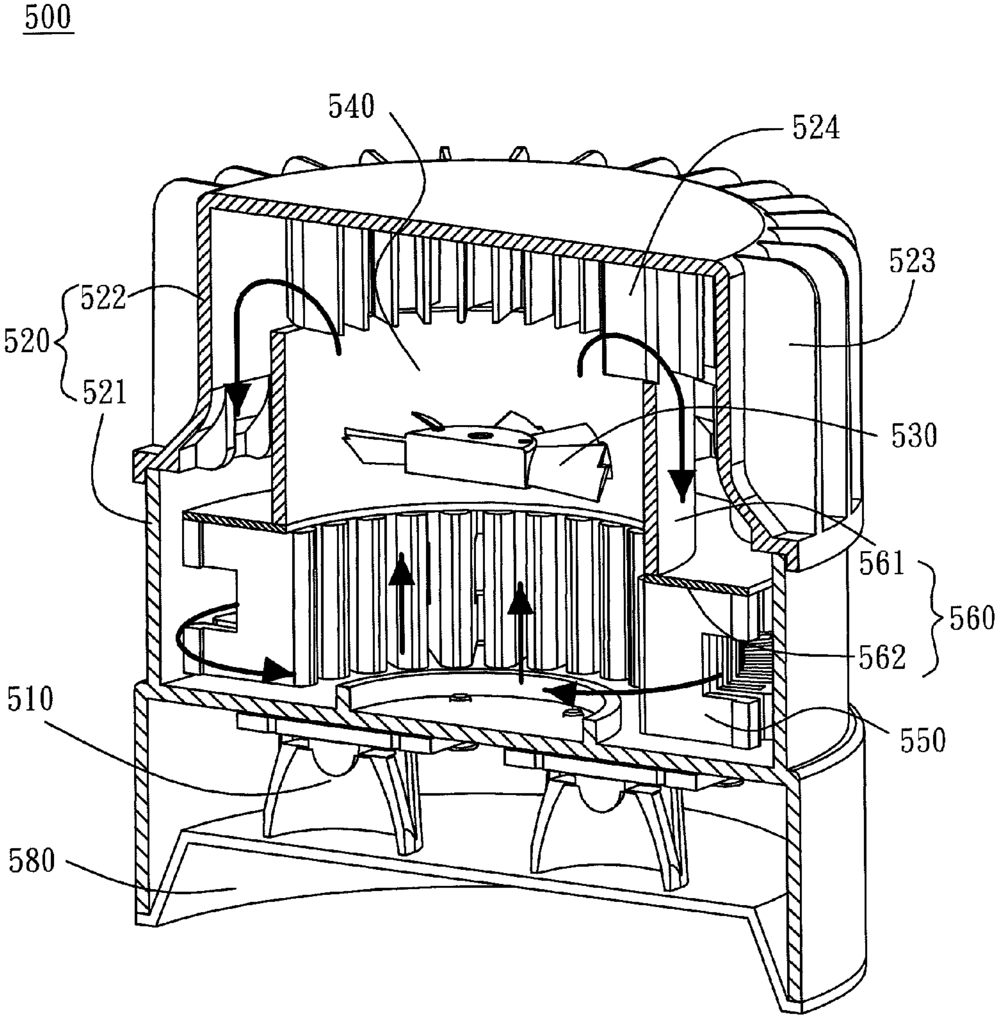
FIG. 4B and FIG. 4C show the air flow within the illuminating device.
Figure 4C:
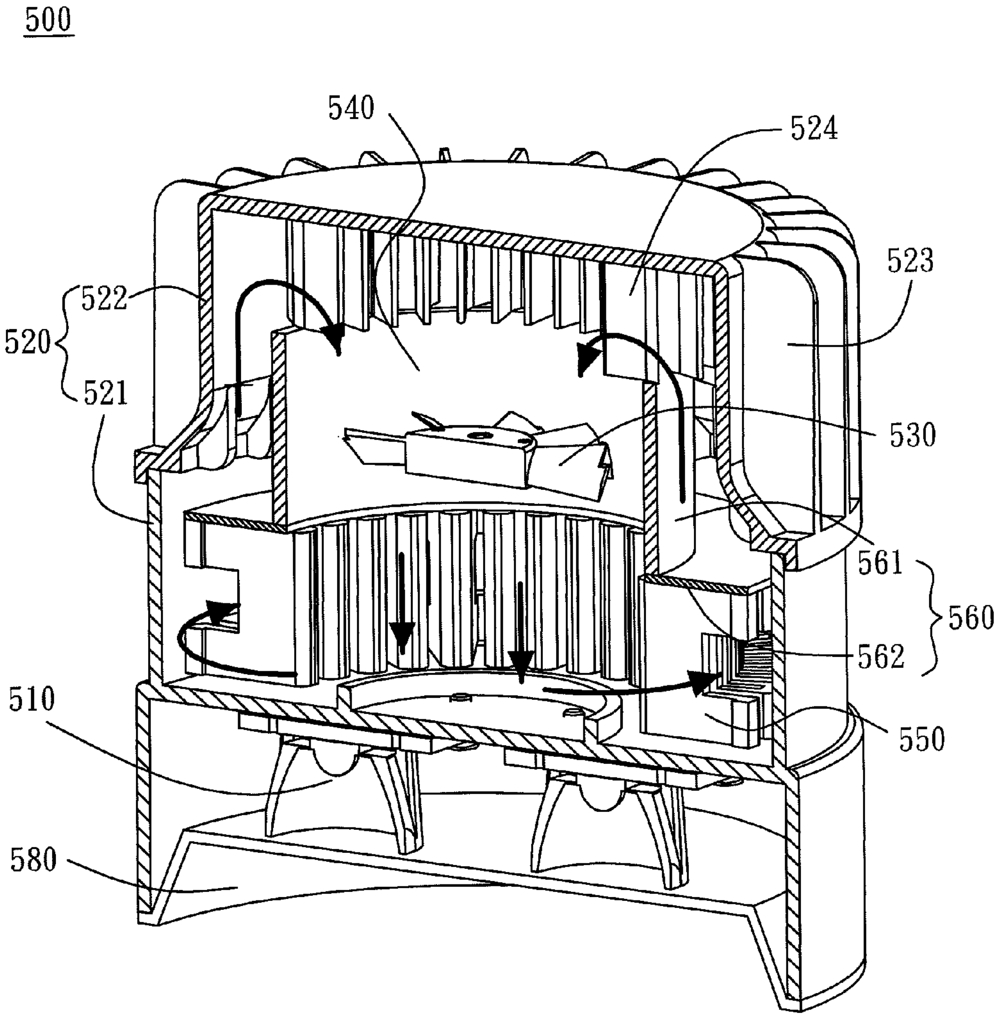

FIG. 4B and FIG. 4C show the air flow within the illuminating device 500. As shown in FIG. 4B, the light module 510 is disposed on the frame 521. The frame 521 and the back cover 522 form a sealed space 540, wherein the frame 521 is made of metal material. The back cover 522 includes a plurality of outer cooling fins 523 and a plurality of inner cooling fins 524. The heat dissipating module 550 is disposed on the frame 521, and the heat dissipating module 550 is disposed near the light module 510 so as to make the heat generated by the light module 510 be transferred to the heat dissipating module 550.

The air guide device 560 is disposed over the heat dissipating module 550 for guiding air flow so as to make the air flow contacts the heat dissipating module 550, the inner cooling fins 524, the back cover 522, and the frame 521 greatly. The fan 530 is disposed within the barrel 561 of the air guide device 560.

The fan 530 makes the air flow within the sealed space 540 be in forced convection condition so as to make the heat generated by the light module 510 be transferred to the whole sealed space 540. Then, the heat is dissipated by the whole shell 520, wherein the outer cooling fins 523 of the back cover 522 contact outside air and perform heat dissipation.

As shown in FIG. 4B, in this embodiment, the fan 530 makes the air near the light module 510 directly flow towards the inner cooling fins 524 of the back cover 522 through the inside of the barrel 561 of the air guide device 560. Then, the cooled air flow towards the light module 510 through the outside of the barrel 561 of the air guide device 560 and the heat dissipating module 550, but not limited to this. As shown in FIG. 4C, the fan 530 makes the air flow towards the light module 510. Then, the heated air flow towards the inner cooling fins 524 of the back cover 522 through the heat dissipating module 550 and the outside of the barrel 561 of the air guide device 560.

Figure 5:
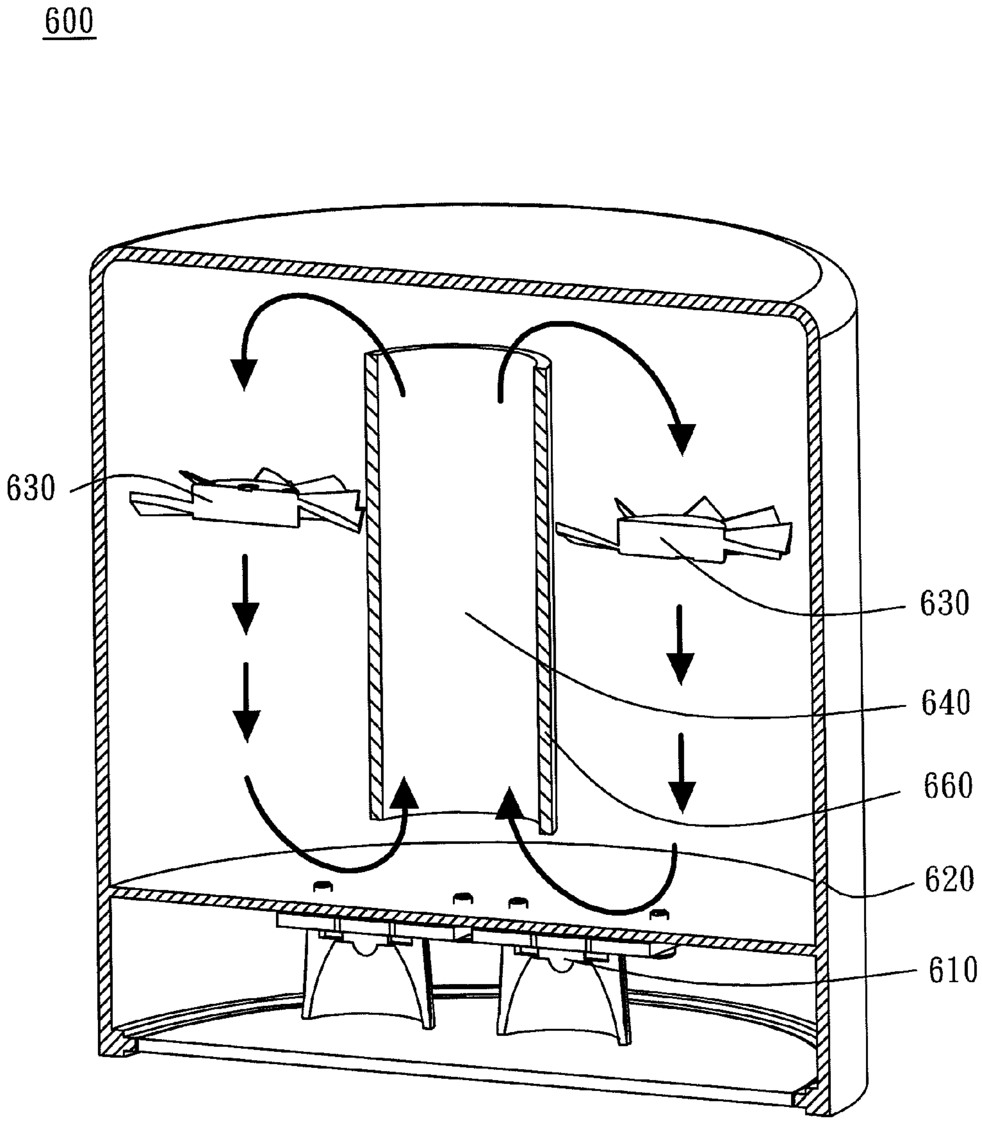
FIG. 5 shows the sectional view of an illuminating device in accordance with another embodiment of the present invention.

FIG. 5 shows the sectional view of an illuminating device 600 in accordance with another embodiment of the present invention. The illuminating device 600 includes a shell 620, at least one light module 610, at least one fan 630, and an air guide device 660.

As shown in FIG. 5, the light module 610 is disposed on the shell 620. The shell 620 includes a sealed space 640. The air guide device 660 is disposed within the sealed space 640, wherein a plurality of fans 630 is disposed in the outside of the air guide device 660, but not limited to this. The number and the position of the fans 630 can be designed according to real needs. By the guiding and blocking of the air guide device 660, the air flow formed by the fans 630 forms the forced convection within the sealed space 640 for performing heat dissipation.

For example, the air flow formed by the fans 630 flow towards the light module 610 through the outside of the air guide device 660. Then, by the guiding and blocking of the air guide device 660, the air flow formed by the fans 630 flow towards the shell 620 through the inside of the air guide device 660 so as to make the heat generated by the light module 610 be transferred to the whole shell 620. Then, the heat is dissipated by the shell 620.

According to this embodiment, the air flow formed by the fans 630 flow towards the light module 610 through the outside of the air guide device 660, but not limited to this. The air flow formed by the fans 630 can flow in the opposite direction. For example, the air flow formed by the fans 630 can flow towards the shell 620 directly through the outside of the air guide device 660. Then, by the guiding and blocking of the air guide device 660, the air flow can flow towards the light module 610 through the inside of the air guide device 660. Then, the air flow can remove the heat generated by the light module 610.

According to this embodiment, the shell 620 has a round column shape, but not limited to this. The shell 620 can have other shape which is designed according to different needs. For example, the illuminating device 600 can be a street lamp. Then, the shell 620 can a street lamp shape. Moreover, in this embodiment, the air guide device 660 has a tube shape, but not limited to this. The air guide device 660 can have other shape which is designed according to different needs. For example, the air guide device 660 can be a component formed by aluminum extrusion process. Or the air guide device 660 can have other shape which is designed according to different needs.

By the illuminating device of the present invention mentioned above, the air flow within the sealed space is in forced convection condition with the use of the fan. The heat generated by the light module can be quickly transferred to the whole sealed space. Then, the heat is dissipated by the shell. There is no need to transfer the heat to the whole shell by the thickness of the shell. Thus, the illuminating device of the present invention can be light-weighted. Besides, the illuminating device of the present invention can have better cooling performance. Moreover, because the fan is disposed within the sealed space, the fan will not be affected by moisture or dust. The fan can have a longer life. The operation sound of the fan will not bother the user.

Although specific embodiments have been illustrated and described, it will be appreciated by those skilled in the art that various modifications may be made without departing from the scope of the present invention, which is intended to be limited solely by the appended claims.

What is claimed is:

1. An illuminating device, comprising:
- a shell, said shell comprising a sealed space;
- a light module, said light module being disposed on said shell; and
- a fan, said fan being disposed within said sealed space.

2. The illuminating device according to claim 1, wherein said fan makes air flow within said sealed space be in forced convection condition so as to make the heat generated by said light module be transferred to said sealed space.

3. The illuminating device according to claim 1, wherein said light module comprises at least one LED, at least one organic light emitting diode (OLED), at least one polymer light-emitting diode (PLED), or a laser light source.

4. The illuminating device according to claim 1, wherein said light module comprises a driving circuit.

5. The illuminating device according to claim 1, wherein said shell comprises a lamp head, said fan makes air flow within said sealed space be in forced convection condition so as to make a part of the heat generated by said light module be transferred to said lamp head.

6. The illuminating device according to claim 5, wherein said shell comprises a first insulating portion and a metal portion, said first insulating portion is disposed between said lamp head and said metal portion.

7. The illuminating device according to claim 6, wherein said shell comprises a second insulating portion, said second insulating portion is disposed between said light module and said metal portion.

8. The illuminating device according to claim 1, wherein said shell comprises at least one inner cooling fin, said inner cooling fin is disposed within said sealed space.

9. The illuminating device according to claim 1, wherein said shell comprises at least one outer cooling fin, said outer cooling fin contacts outside air.

10. The illuminating device according to claim 1, wherein said light module comprises a metal substrate, said fan makes air within said sealed space be transferred towards said metal substrate so as to make the heat generated by said light module be transferred to said sealed space.

11. The illuminating device according to claim 1, wherein said illuminating device is a LED lamp.

12. The illuminating device according to claim 1, wherein said illuminating device is a mercury vapor lamp.

13. The illuminating device according to claim 1, wherein said illuminating device is an illumination lamp set.

14. The illuminating device according to claim 1, wherein said illuminating device comprises a ceiling lamp, a down lamp, or a recessed lamp.

15. The illuminating device according to claim 1, further comprising a flexible conductor, wherein said flexible conductor contacts said shell and a part of a building for transferring the heat of said shell to said building.

16. The illuminating device according to claim 1, further comprising a heat dissipating module, wherein said heat dissipating module comprises a plurality of cooling fins, said cooling fins form at least one longitudinal air passage and at least one circular air passage.

17. The illuminating device according to claim 1, wherein said heat dissipating module is dispose near said light module so as to make the heat generated by said light module be transferred to said heat dissipating module.

18. The illuminating device according to claim 1, further comprising an air guide device for guiding air within said shell.

* * * * *